US011821825B2

(12) United States Patent
Swanson et al.

(10) Patent No.: US 11,821,825 B2
(45) Date of Patent: Nov. 21, 2023

(54) THERMODENUDER AND METHOD FOR REMOVING SEMI-VOLATILE MATERIAL AND SEMI-VOLATILE PARTICLES FROM AN AEROSOL

(71) Applicant: Catalytic Instruments GmbH & Co. KG, Rosenheim (DE)

(72) Inventors: Jacob John Swanson, Richfield, MN (US); Adam Meyer Boies, Cambridge (GB); Hans-Joachim Schulz, Rosenheim (DE)

(73) Assignee: Catalytic Instruments GmbH & Co. KG, Rosenheim (DE)

( * ) Notice: Subject to any disclaimer, the term of this patent is extended or adjusted under 35 U.S.C. 154(b) by 290 days.

(21) Appl. No.: 17/233,613

(22) Filed: Apr. 19, 2021

(65) Prior Publication Data

US 2021/0325281 A1    Oct. 21, 2021

Related U.S. Application Data

(60) Provisional application No. 63/012,631, filed on Apr. 20, 2020.

(51) Int. Cl.
*B01D 53/02* (2006.01)
*G01N 1/34* (2006.01)
(Continued)

(52) U.S. Cl.
CPC ............... *G01N 1/34* (2013.01); *B01B 1/00* (2013.01); *B01D 53/04* (2013.01); *G01N 1/405* (2013.01); *B01D 2253/10* (2013.01)

(58) Field of Classification Search
CPC . G01N 1/34; G01N 1/405; B01B 1/00; B01D 53/04; B01D 2253/10
See application file for complete search history.

(56) References Cited

U.S. PATENT DOCUMENTS 4,541,851 A * 9/1985 Bosquain ............. B01D 53/261
96/126
5,477,706 A * 12/1995 Kirol ........................ G06F 1/20
62/480
(Continued)

FOREIGN PATENT DOCUMENTS

DE    102012003518 A1    8/2013

OTHER PUBLICATIONS

Woo Jin An et al.; "Aerosol volatility measurement using an improved thermodenuder: Application to secondary organic aerosol"; Journal of Aerosol Science, vol. 38; pp. 305-314; 2007; DOI: 10.1016/j.jaerosci.2006.12.002 (10 pages).
(Continued)

*Primary Examiner* — Christopher P Jones
(74) *Attorney, Agent, or Firm* — Nixon Peabody LLP

(57) ABSTRACT

A thermodenuder having a main tube with an outer wall, and a heater (23) arranged within the main tube. The heater is arranged in the center of a cross section through the main tube and is spaced apart from the outer wall of the main tube. The main tube has a main axis of extension, and the heater extends parallel to the main axis. The main tube has two openings that are arranged at opposing side faces of the main tube. A channel for an aerosol is arranged within the main tube between the heater and the outer wall and between the two openings. Furthermore, a method for removing semi-volatile material and semi-volatile particles from an aerosol is provided.

15 Claims, 2 Drawing Sheets

Figure 1:
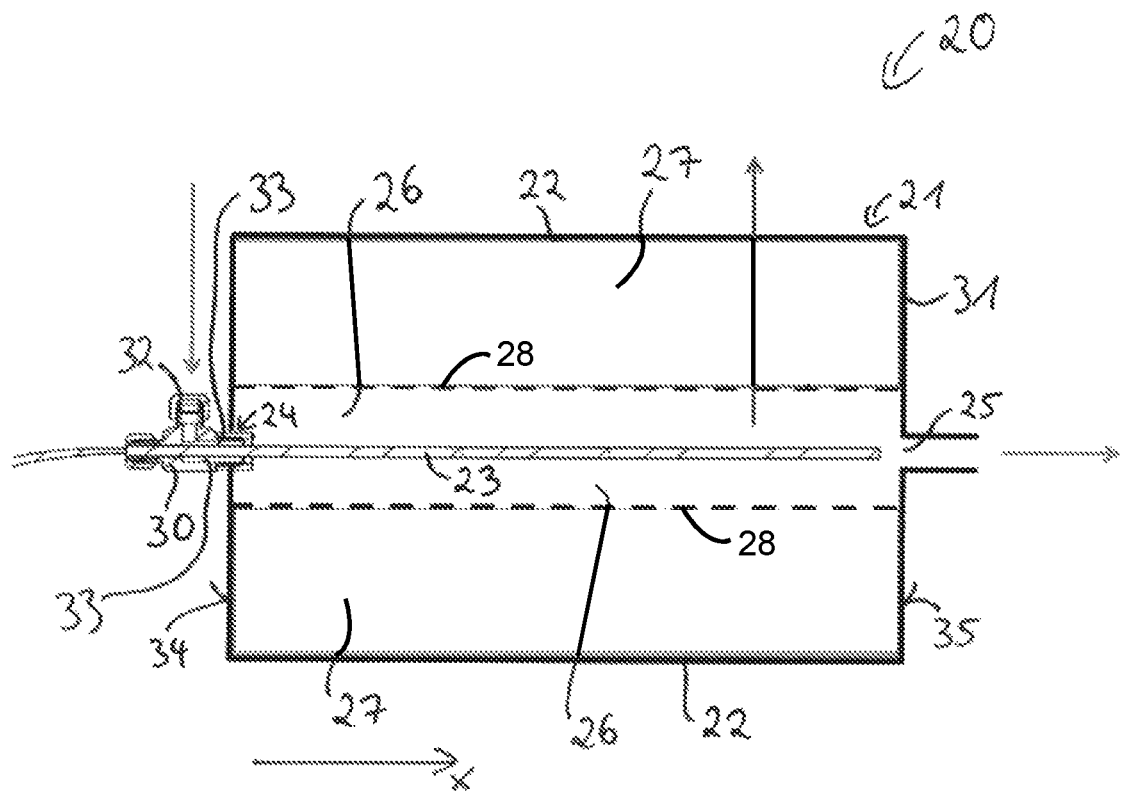
Figure 2:
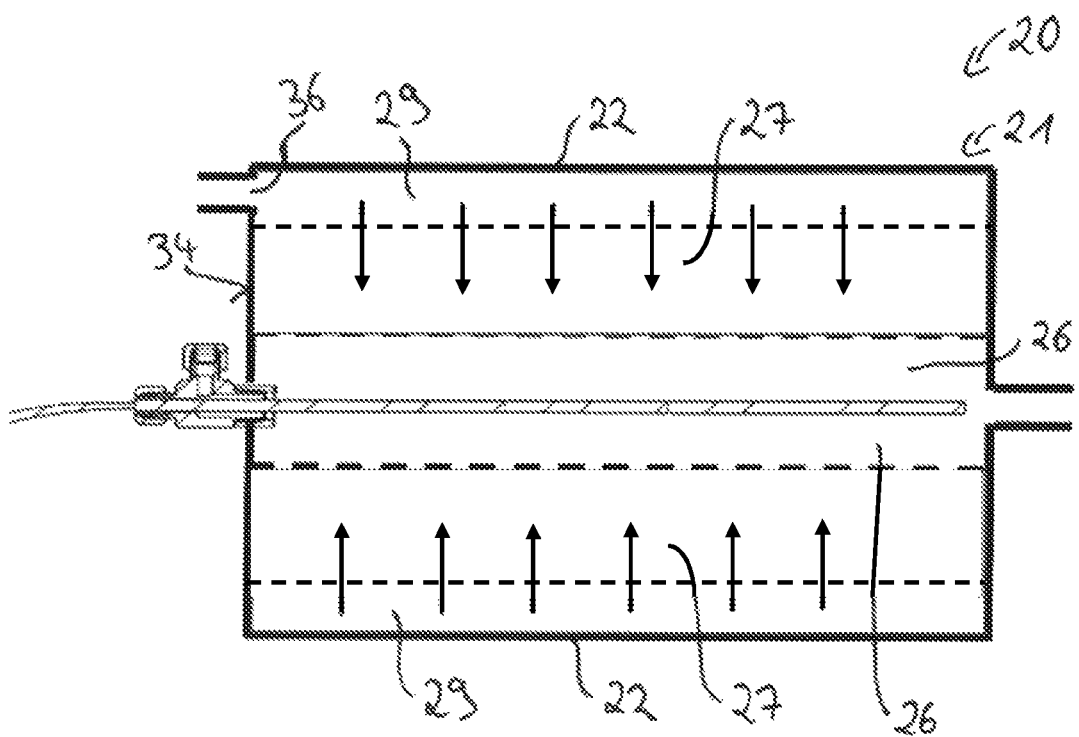
Figure 3:
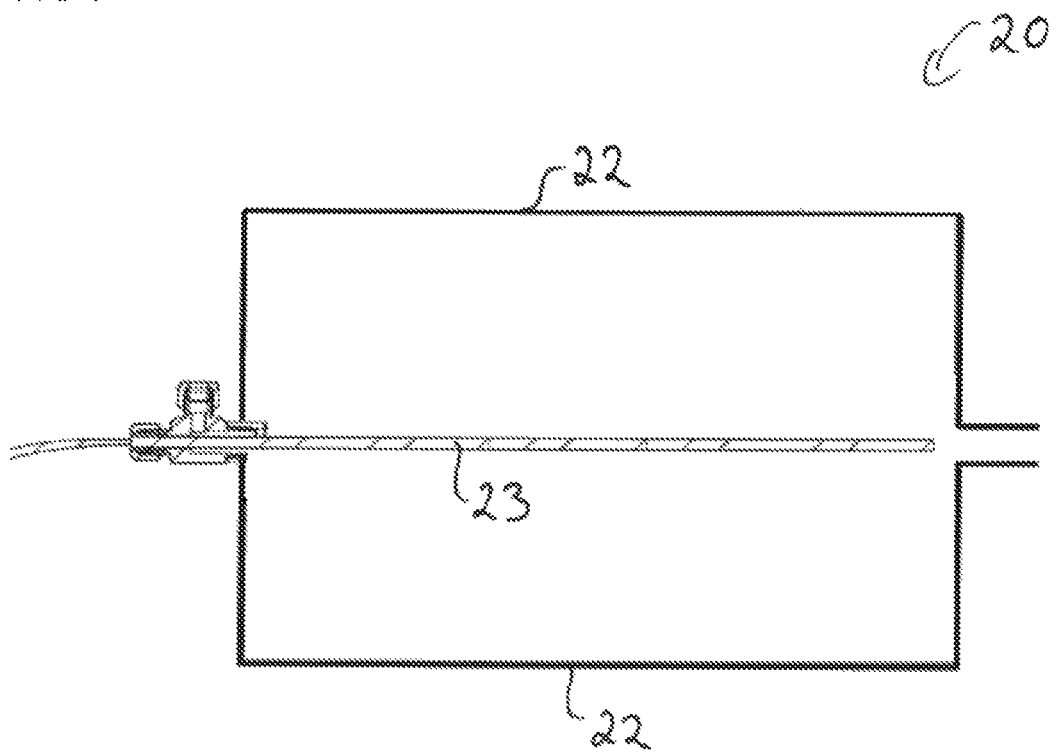

(51) Int. Cl.
  B01B 1/00 (2006.01)
  B01D 53/04 (2006.01)
  G01N 1/40 (2006.01)

(56) References Cited

U.S. PATENT DOCUMENTS

| | | | | |
|---|---|---|---|---|
| 5,759,242 | A * | 6/1998 | Smolarek | B01D 53/0431 96/144 |
| 5,814,129 | A * | 9/1998 | Tentarelli | B01J 8/008 96/139 |
| 5,827,485 | A * | 10/1998 | Libal | B01J 8/0214 422/221 |
| 6,086,659 | A * | 7/2000 | Tentarelli | B01J 8/0411 96/151 |
| 6,319,484 | B1 | 11/2001 | Shore et al. | |
| 6,361,584 | B1 * | 3/2002 | Stevens | B01D 53/047 95/138 |
| 8,101,133 | B2 * | 1/2012 | Ackley | B01D 53/0431 422/240 |
| 8,216,343 | B2 * | 7/2012 | Ackley | B01D 53/0431 422/240 |
| 8,313,561 | B2 * | 11/2012 | Celik | B01J 8/0214 96/108 |
| 8,337,592 | B2 * | 12/2012 | Monereau | B01D 53/0462 95/99 |
| 10,668,426 | B2 * | 6/2020 | Grahl | B01J 8/0015 |
| 11,666,852 | B1 * | 6/2023 | Weissman | B01D 53/0462 95/90 |
| 2006/0254420 | A1 * | 11/2006 | Monereau | B01D 53/0431 95/96 |
| 2015/0135952 | A1 * | 5/2015 | Chen | B01D 53/0438 95/115 |
| 2017/0196268 | A1 * | 7/2017 | Reevell | B65D 49/02 |
| 2018/0126319 | A1 * | 5/2018 | Ferstl | B01J 8/002 |
| 2022/0065530 | A1 * | 3/2022 | Davidian | B01D 53/0407 |
| 2023/0249122 | A1 * | 8/2023 | Ho | B01D 53/0446 95/96 |
| 2023/0250269 | A1 * | 8/2023 | Nakaya | C08K 5/13 428/34.2 |

OTHER PUBLICATIONS

Burtscher; H. et al.; "Separation of volatile and non-volatile aerosol fractions by thermodesorption: instrumental development and applications"; Journal of Aerosol Science; vol. 32; pp. 427-442; 2001 (16 pages).

Villani; P. et al.; "Design and Validation of a 6-Volatility Tandem Differential Mobility Analyzer (VTDMA)"; Aerosol Science and Technology; 41:10; pp. 898-906; 2007; DOI: 10.1080/02786820701534593; ISSN: 0278-6826 (10 pages).

Faulhaber; A. E. et al.; "Characterization of a thermodenuder-particle beam mass spectrometer system for the study of organic aerosol volatility and composition"; Atmospheric Measurement Techniques; 2; pp. 15-31; 2009 (17 pages).

Dekati Ltd.; Data Sheet for "Dekati Thermodenuder"; Aug. 2010 (2 pages).

Fierz; M. et al.; "An improved low-flow thermodenuder"; Journal of Aerosol Science; vol. 38; pp. 1163-1168; 2007; DOI: 10.1016/j.jaerosci.2007.08.006 (6 pages).

Mendes, L. et al.; "Performance comparison of two therrnodenuders in Volatility Tandem DMA measurements"; Journal of Aerosol Science; vol. 92; pp. 38-52; 2016 (15 pages).

Park, D. et al.; "Development and performance test of a thermosdenuder for separation of volatile matter from submicron aerosol particles"; Journal of Aerosol Science, vol. 39, pp. 1099-1108; 2008; DOI: 10.1016/j.jaerosci.2008.07.002 (10 pages).

Paulsen, D. et al.; "Volatility measurements of photochemically and nebulizer-generated organic aerosol particles"; Journal of Aerosol Science, vol. 37, pp. 1025-1051; 2006; DOI: 10.1016/j.jaerosci.2005.08.004 (27 pages).

Topas GmbH; Data Sheet for "Model TDD 590 Thermodenuder"; retrieved from https://www.topas-gmbh.de/en/produkte/tdd-590/ on Aug. 20, 2019 (5 pages).

* cited by examiner

THERMODENUDER AND METHOD FOR REMOVING SEMI-VOLATILE MATERIAL AND SEMI-VOLATILE PARTICLES FROM AN AEROSOL

CROSS-REFERENCE TO RELATED APPLICATIONS

This application claims the benefit of U.S. Provisional Application Ser. No. 63/012,631, filed Apr. 20, 2020, which is incorporated herein by reference in its entirety.

The present invention relates to a thermodenuder and a method for removing semi-volatile material and semi-volatile particles from an aerosol.

Thermodenuders are employed to remove semi-volatile material and semi-volatile particles from the nonvolatile particles of an aerosol. Typically, the semi-volatile material and semi-volatile particles are evaporated so that the nonvolatile particles remain. For this purpose the aerosol is heated so that the semi-volatile material and semi-volatile particles are evaporated. Subsequently, the aerosol and the evaporated semi-volatile material are cooled down so that the semi-volatile material is adsorbed by an adsorbent material or surface.

However, two processes can reduce the efficiency of removing semi-volatile material and semi-volatile particles from nonvolatile particles of an aerosol. At first, the evaporated semi-volatile material can nucleate and form additional particles instead of being adsorbed. At second, the evaporated semi-volatile material can re-adsorb on the nonvolatile particles of the aerosol again.

It is an objective to provide a thermodenuder that can be operated efficiently. It is further an objective to provide an efficient method for removing semi-volatile material and semi-volatile particles from an aerosol.

These objectives are achieved with the independent claims. Further embodiments are the subject of dependent claims.

In at least one embodiment of the thermodenuder, the thermodenuder comprises a main tube with an outer wall. The outer wall forms the main tube. The main tube can have the shape of a cylinder which is formed by the outer wall. The main tube can be closed at both sides of the cylinder except for two openings. The outer wall surrounds an inner volume of the main tube. The main tube can also have any other shape, for example a rectangular shape. The main tube can comprise stainless steel.

Another expression for the thermodenuder is a thermodesorber.

The thermodenuder further comprises a heater arranged within the main tube. The heater can be arranged completely within the main tube. The heater can be a resistive heater. This means, the heater can comprise an electrically conductive material. For example, the heater comprises an electrically conductive wire. The heater is configured to be heated to a temperature of at least 20° C. and at most 400° C. This means, the thermodenuder is configured to heat an aerosol within the thermodenuder to a temperature of at least 20° C. and at most 400° C. The thermodenuder can furthermore be configured to control the temperature of the heater.

The main tube has a main axis of extension. The main axis of extension refers to the axis along which the cylinder extends. Within a cylinder the main axis of extension relates to the vertical direction. The main axis of extension of the main tube connects two side faces of the main tube that extend parallel to each other.

The heater is arranged in the center of a cross section through the main tube. The cross section through the main tube can be given in a plane that is perpendicular to the main axis of extension of the main tube. In this cross section the main tube has a circular shape. The heater is arranged in the center of the circle in this cross section. This means, in this cross section the heater is surrounded by the outer wall of the main tube in all directions. It is further possible that the cross section through the main tube is given in a plane to which the main axis of extension of the main tube runs parallel. This cross section can be a cut through the center of the main tube. In this cross section the heater is arranged in the center of the main tube and extends along the main axis of extension of the main tube. In this cross section the outer wall of the main tube is arranged above and below the heater. That the heater is arranged in the center of a cross section thorough the main tube can mean that the heater is arranged approximately in the center of a cross section through the main tube. It can further mean that at least a part of the heater is arranged in the center of a cross section through the main tube.

The heater is spaced apart from the outer wall of the main tube. This means, the heater is not in direct contact with the outer wall of the main tube. The heater is arranged at a distance to the outer wall of the main tube. In a cross section through the main tube in a plane that extends perpendicular to the main axis of extension of the main tube the distance between the heater and the outer wall is the same in each direction.

The heater extends parallel to the main axis of extension of the main tube. This means at least a part of the heater extends parallel to the main axis of extension of the main tube. The heater can have an elongated shape. Furthermore, the heater can have a straight shape.

The main tube has two openings which are arranged at opposing side faces of the main tube. The opposing side faces can be the side faces of a cylinder that extend parallel to each other. The openings can each be smaller than the area of the side faces. The openings can have a circular shape. The diameters of the openings can be larger than the diameter of the heater. The diameters of the openings are large enough so that an aerosol can pass each of the openings. In cross sections through the main tube in planes that extend perpendicular to the main axis of extension of the main tube the openings are each arranged in the center of the main tube. This means, the openings are each arranged in the center of the respective side face. The two openings and the heater lie on a straight line that extends parallel to the main axis of extension of the main tube.

A channel for an aerosol is arranged within the main tube between the heater and the outer wall and between the two openings. This means the channel is formed between the heater and the outer wall and between the two openings. The size of the channel is large enough so that an aerosol can pass through the channel. The channel connects the two openings with each other. Furthermore, the channel extends along the heater. The channel extends along the main axis of extension of the main tube. In a cross section through the main tube in a plane that extends perpendicular to the main axis of extension of the main tube the channel surrounds the heater. The channel can surround the heater in all directions in the cross section. The aerosol can be for example exhaust from an engine.

The thermodenuder described herein can be employed to remove semi-volatile material and semi-volatile particles from nonvolatile particles of an aerosol. This means, semi-volatile material and semi-volatile particles can be separated from nonvolatile particles of an aerosol. For this purpose an aerosol is provided to one of the openings of the main tube and led into the main tube. Within the main tube the aerosol moves within the channel along the main axis of extension of the main tube. This means, the aerosol enters the main tube through one of the openings and leaves the main tube through the other opening. When moving through the channel the aerosol is heated by the heater. In this way semi-volatile material and semi-volatile particles of the aerosol are evaporated. The outer wall of the main tube is in contact with the surroundings of the main tube. The surroundings of the main tube are cooler than the heater. Therefore, a temperature gradient is present within the main tube during operation of the thermodenuder. The temperature gradient runs from the center of the main tube where the heater is arranged to the outer wall. This means, within the main tube the temperature in the vicinity of the heater is higher than the temperature in the vicinity of the outer wall. The material and the particles evaporated from the aerosol can adsorb on the outer wall or on an adsorbent material arranged within the main tube. The aerosol with the remaining nonvolatile particles is led out of the main tube.

The evaporated semi-volatile material and semi-volatile particles can move within the main tube and adsorb on colder surfaces as the outer wall or an adsorbent material. On these surfaces the evaporated semi-volatile material and semi-volatile particles are cooled because of the cooler environment. Thus, the semi-volatile material and semi-volatile particles stay at the surface where they are adsorbed.

In this way an adsorption of semi-volatile material on other evaporated material or on nonvolatile particles of the aerosol is reduced. The evaporated semi-volatile material is first adsorbed, for example on the outer wall, and then cooled down. This means, when the semi-volatile material is cooled it is already separated and spaced apart from the remaining nonvolatile particles of the aerosol. This reduces the probability for a re-adsorption of semi-volatile material on nonvolatile particles of the aerosol. Because of the temperature gradient within the main tube the adsorption capacity is maximized at positions within the main tube that are closer to the outer wall than to the heater. At the colder positions closer to the outer wall the adsorption capacity is increased in comparison to positions close to the heater. This means, a region for the adsorption of evaporated semi-volatile material is formed spaced apart from the heater and the remaining nonvolatile particles. Thus, a re-adsorption on nonvolatile particles is avoided.

Another advantage of the thermodenuder is that the temperature of the aerosol can be changed quickly. The aerosol within the channel is in direct contact with or close to the heater. In order to heat the aerosol it is not necessary to heat any other material because the aerosol is directly heated by the heater. This setup enables a faster temperature change than a setup where the heater is arranged around the main tube.

In addition, the setup of the thermodenuder is compact since only one main tube is required.

In at least one embodiment of the thermodenuder, an adsorbent material is arranged within the main tube between the outer wall and the heater. It is possible that the adsorbent material is in direct contact with the outer wall. Alternatively, the adsorbent material is arranged spaced apart from the outer wall. In a cross section through the main tube within a plane that extends perpendicular to the main axis of extension of the main tube the adsorbent material surrounds the heater in all directions. Along the main axis of extension of the main tube the adsorbent material can have the same extent as the main tube. This means, the adsorbent material extends over the whole length of the main tube. The adsorbent material can be a porous material. This means, the adsorbent material has a large surface where semi-volatile material can adsorb. For example the adsorbent material comprises activated carbon, ceramic fiber, glass fiber or silica gel. During operation of the thermodenuder evaporated semi-volatile material of the aerosol can adsorb on or within the adsorbent material. For this purpose the adsorbent material has a large surface. In this way a large amount of evaporated semi-volatile material can be adsorbed on or within the adsorbent material. Furthermore, during operation of the thermodenuder the adsorbent material has a cooler temperature than the heater. Thus, the probability for evaporated semi-volatile material that is adsorbed on or within the adsorbent material to stay on or within the adsorbent material is increased because the adsorbed semi-volatile material is cooled by the adsorbent material. Because of the temperature gradient and the cooler temperature of the adsorbent material the adsorption capacity of the adsorbent material is increased. In this way, the efficiency of removing volatile particles from nonvolatile particles of the aerosol is increased.

In at least one embodiment of the thermodenuder, the adsorbent material is arranged spaced apart from heater. This means, the adsorbent material is not in direct contact with the heater. In this way the temperature gradient between the heater and the adsorbent material is achieved. As there is a distance between the adsorbent material and the heater the adsorbent material has a reduced temperature in comparison to the heater during operation of the thermodenuder. Thus, the aerosol within the channel is heated by the heater during operation of the thermodenuder. The evaporated semi-volatile material that is adsorbed on or within the adsorbent material is cooled by the cooler adsorbent material and thus stays on or within the adsorbent material. In this way, the efficiency of removing semi-volatile material and semi-volatile particles from nonvolatile particles of the aerosol is increased.

In at least one embodiment of the thermodenuder, the adsorbent material comprises ceramic fiber. Ceramic fiber has a large surface. Therefore, a large amount of evaporated semi-volatile material can be adsorbed on and within the ceramic fiber.

In at least one embodiment of the thermodenuder, an inner tube is arranged within the main tube between the adsorbent material and the heater, where the inner tube is permeable for gases and the channel is arranged within the inner tube. The inner tube can further be permeable for semi-volatile material. The inner tube separates the adsorbent material from the channel for the aerosol. Thus, the inner tube is in direct contact with the adsorbent material. The channel is formed within the inner tube. The inner tube has a cylindrical shape. The inner tube is arranged completely within the main tube. The inner tube has the same extent along the main axis of extension of the main tube than the main tube. In a cross section through the main tube in a plane that is perpendicular to the main axis of extension of the main tube the inner tube surrounds the channel and the heater in all directions. The inner tube is permeable for gases and particles. This means, the inner tube is porous. For example, the inner tube is formed by or comprises a wire mesh or a metal mesh. For example, the inner tube comprises Teflon. In this way, the evaporated semi-volatile material and semi-volatile particles can move from the channel to the adsorbent material. The inner tube is employed to prevent the adsorbent material from entering the channel.

In at least one embodiment of the thermodenuder, a further channel is arranged between the outer wall and the adsorbent material. The further channel is in direct contact with the outer wall and the adsorbent material. The further channel has the same extent along the main axis of extension of the main tube as the main tube. This means, the further channel has the same length as the main tube. In a cross section through the main tube in a plane that is perpendicular to the main axis of extension of the main tube the further channel surrounds the adsorbent material in all directions. At one of the side faces of the main tube a further opening is arranged that is connected with the further channel. The further opening is arranged closer to the outer wall than the opening. The further channel can be employed to remove adsorbed semi-volatile material from the adsorbent material. This process can also be called regeneration. After operating the thermodenuder for a while a large amount of evaporated semi-volatile material is adsorbed on or within the adsorbent material. In order to enable the adsorption of more evaporated semi-volatile material and semi-volatile particles it is necessary to remove the adsorbed semi-volatile material. This can be achieved by establishing a flow of gas or air through the further opening towards the opening on the opposite side of the main tube. In this way the flow of gas or air flows through the adsorbent material. With the flow of gas or air the adsorbed semi-volatile material can be removed from the adsorbent material. The temperature of the air or gas is higher than the temperature of the adsorbent material. This means, the adsorbed semi-volatile material and semi-volatile particles are evaporated from the adsorbent material again and are carried out of the main tube by the flow of gas or air. In this way, the adsorbent material is regenerated or cleaned. The regeneration or cleaning of the adsorbent material is necessary for an efficient operation of the thermodenuder.

In at least one embodiment of the thermodenuder, one of the openings is connected with a fitting. The fitting can be a valve. The main tube has two side faces, namely a first side face and a second side face. The opening that is arranged at the first side face is referred to as the first opening. The first opening is connected with the fitting. The fitting can be configured to control the flow of an aerosol towards the main tube. The fitting can be connected with another tube for leading the aerosol towards the main tube. The fitting can be connected to the channel so that an aerosol can enter the main tube through the fitting into the channel. Furthermore, the heater can be connected to the fitting. In this way, the heater can be fixed within the main tube. The connection of the heater to the fitting can be the only connection point of the heater with a part of the main tube. The fitting enables advantageously to control of the flow of an aerosol within the main tube.

In at least one embodiment of the thermodenuder, the main tube has the shape of a cylinder. The cylinder is formed by the outer wall. In this way the main tube has a symmetric shape and a uniform flow of an aerosol within the main tube is enabled.

In at least one embodiment of the thermodenuder, the heater extends along at least 80% of the length of the main tube parallel to the main axis of extension of the main tube. This means the heater can have nearly the same length as the main tube along the main axis of extension of the main tube. In this way a uniform heating of the aerosol within the main tube is achieved. The geometry of the thermodenuder is chosen in such a way that there is a temperature gradient from the center of the main tube where the heater is arranged towards the adsorbent material and the outer wall. Thus, a cooling of semi-volatile material only takes place at a distance to the heater where the adsorbent material or the outer wall is arranged so that evaporated semi-volatile material can adsorb on the outer wall or on or within the adsorbent material instead of on other particles. This is achieved by the extension of the heater along most of the length of the main tube. A cooling of the aerosol in the center of the main tube, where an adsorption of evaporated semi-volatile material is not desired, is avoided.

In at least one embodiment of the thermodenuder, the channel is in direct contact with the heater. The channel is the region where the aerosol is led through the main tube. Thus, the aerosol is led through the main tube directly around the heater. During operation, the aerosol within the main tube is in direct contact with the heater. This arrangement enables an efficient heating of the aerosol in the center of the main tube. The aerosol is not heated via another material but directly by the heater. In addition, this advantageously enables a fast change of the temperature of the aerosol.

In at least one embodiment of the thermodenuder, one of the side faces of the main tube in which one of the openings is arranged is formed by a cap that is reversibly attached to the main tube. The second side face of the main tube is formed by a cap that is reversibly attached to the main tube. This means, the side face which is formed by a cap is arranged at the side of the main tube opposite to the side face where the fitting is arranged. The cap can have the shape of a circle. The cap can cover the whole second side face of the main tube. That the cap is reversibly attached to the main tube means that the cap can be removed and placed again at the main tube. When the cap is arranged at the main tube it closes the main tube. Employing the cap enables the replacement of the adsorbent material. For this purpose the cap is removed and the adsorbent material is taken out of the main tube. Afterwards, a new adsorbent material is placed in the main tube and the cap is placed again at the main tube. It can be necessary to replace the adsorbent material once a large amount of semi-volatile material is adsorbed on or within the adsorbent material.

Furthermore, a method for removing semi-volatile material and semi-volatile particles from an aerosol is provided. The thermodenuder can preferably be employed in the methods described herein. This means all features disclosed for the thermodenuder are also disclosed for the method for removing semi-volatile material and semi-volatile particles from an aerosol.

According to at least one embodiment of the method for removing semi-volatile material and semi-volatile particles from an aerosol, the method comprises the step of providing a main tube with an outer wall, where a heater is arranged within the main tube.

The method further comprises heating a volume surrounding the heater by the heater. This means, the heater is employed to heat the surroundings of the heater. If the heater is a resistive theater this can mean that a voltage is applied to the heater or an electrical current is led through the heater.

The method further comprises leading an aerosol through the main tube and through two openings of the main tube where the two openings are arranged at opposing side faces of the main tube. A flow of the aerosol through the main tube can for example be established by employing a flow controller. The flow controller can be connected with one of the openings of the main tube. The flow controller can be configured to control the amount and the velocity of the aerosol led into the main tube. The aerosol enters the main tube through the first opening, traverses the main tube and leaves the main tube through the second opening.

The heater is arranged in the center of a cross section through the main tube. The heater is spaced apart from the outer wall of the main tube. The main tube has a main axis of extension. The heater extends parallel to the main axis of extension of the main tube.

A channel for the aerosol is arranged within the main tube between the heater and the outer wall and between the two openings. This means, an aerosol being led through the main tube enters the main tube through the first opening, traverses the main tube through the channel and leaves the main tube through the second opening.

According to at least one embodiment of the method, semi-volatile material and semi-volatile particles of the aerosol are evaporated within the main tube. When passing through the channel the aerosol is heated by the heater. In this way semi-volatile material of the aerosol is evaporated. This means, semi-volatile material and nonvolatile particles of the aerosol are separated from each other. The evaporated semi-volatile material and semi-volatile particles can adsorb on the outer wall or the adsorbent material. The remaining nonvolatile particles leave the main tube through the second opening. This enables a further analysis of the nonvolatile particles without the semi-volatile material.

According to at least one embodiment of the method, the main tube is heated from outside of the main tube. This means, outside of the main tube a further heater can be placed in order to heat the main tube. For example, the further heater is arranged adjacent to the outer wall. In this way, the outer wall and the adsorbent material are heated. Thus, semi-volatile material adsorbed on the outer wall or on or within the adsorbent material are evaporated. In this way, the outer wall or the adsorbent material are cleaned. This cleaning is necessary in order to enable an efficient operation of the thermodenuder.

According to at least one embodiment of the method, a gas flow is provided through a further channel that is arranged between the outer wall and an adsorbent material that is arranged between the further channel and the channel. The gas is led into the further channel through a further opening that is connected with the further channel. The further opening is arranged within the first side face. The flow of the gas can be controlled by a flow controller. Furthermore, the gas led into the further channel is heated. This means, the temperature of the gas led into the further channel is higher than the temperature of the adsorbent material during operation of the thermodenuder. The gas led into the further channel traverses the adsorbent material and leaves the main tube through the second opening. As the gas is heated it also heats the adsorbent material. Therefore, semi-volatile material adsorbed to the adsorbent material are evaporated again and transported out of the main tube with the flow of gas. In this way, the adsorbent material is regenerated or cleaned.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

In FIG. 1 a cross section through an exemplary embodiment of the thermodenuder is shown.

In FIGS. 2 and 3 cross sections through further exemplary embodiments of the thermodenuder are shown.

FIG. 1 shows a cross section through the thermodenuder 20 according to an exemplary embodiment. The thermodenuder 20 has a cylindrical shape. The cross section is a cut through the center of the thermodenuder 20 along the main axis of extension x of the cylinder. The main axis of extension x of the thermodenuder 20 is the vertical axis of the cylinder. This means, the side faces 34, 35 at the left and right of the thermodenuder 20 are the circular shaped areas of the cylinder that extend parallel to each other. The extent of the thermodenuder 20 along its main axis of extension x can be less than 1 meter.

The thermodenuder 20 comprises a main tube 21 with an outer wall 22. The outer wall 22 establishes the cylinder shape of the thermodenuder 20. Thus, the main tube 21 has the shape of a cylinder. The outer wall 22 delimits the main tube 21. The outer wall 22 can comprise stainless steel or any other metal. The thermodenuder 20 further comprises a heater 23 which is arranged within the main tube 21. The heater 23 is arranged in the center of the main tube 21. In the cross section shown in FIG. 1 the heater 23 is arranged in the center surrounded by the outer wall 22. In a cross section in a plane which is perpendicular to the plane shown in FIG. 1 the heater 23 is arranged in the center of the main tube 21 and is completely surrounded by the outer wall 22. The heater 23 is not in direct contact with the outer wall 22 but spaced apart from the outer wall 22. The main tube 21 has a main axis of extension x which runs parallel to the main axis of extension x of the cylinder. The heater 23 extends parallel to the main axis of extension x of the main tube 21. The heater 23 can be a resistive heater 23 in form of an electrical conductor extending along most of the extent of the main tube 21. The heater 23 extends parallel to the main axis of extension x of the main tube 21.

The main tube 21 has two openings 24, 25 which are arranged at opposing side faces 34, 35 of the main tube 21. The two openings 24, 25 are referred to as a first opening 24 and a second opening 25. The first opening 24 is arranged within the first side face 34 one of the side faces 34, 35 of the main tube 21. The second opening 25 is arranged within the second side face 35 of the side faces 34, 35 of the main tube 21. The first opening 24 is connected with a fitting 30. The fitting 30 completely fills the first opening 24. Through the fitting 30 an aerosol or a gas can be led into the main tube 21 which is shown by an arrow. The heater 23 is fixed to the fitting 30. The heater 23 is arranged at the center of the fitting 30. Around the heater 23 is a passage 33 for a gas or an aerosol within the fitting 30 so that an aerosol or a gas can be led through the fitting 30 into the main tube 21. The fitting 30 has an inlet 32 where an aerosol or a gas can be provided to the fitting 30.

Within the main tube 21 a channel 26 for an aerosol is arranged between the heater 23 and the outer wall 22 and between the two openings 24, 25. The channel 26 extends from the passage 33 within the fitting 30 to the second opening 25. This means, the channel 26 extends between the two openings 24, 25. Furthermore, the channel 26 is adjacent to the heater 23. This means, the channel 26 is in direct contact with the heater 23.

Within the main tube 21 an adsorbent material 27 is arranged between the outer wall 22 and the heater 23. The adsorbent material 27 can comprise activated carbon. Furthermore, the adsorbent material 27 is arranged spaced apart from the heater 23 so that it is not in direct contact with the heater 23.

The channel 26 is formed within an inner tube 28 that is arranged within the main tube 21 between the adsorbent material 27 and the heater 23. The inner tube 28 is permeable for gases and semi-volatile material. The inner tube 28 separates the adsorbent material 27 from the channel 26. The adsorbent material 27 fills the whole space between the inner tube 28 and the outer wall 22. The channel 26 fills the whole space within the inner tube 28 which is not occupied by the heater 23. Thus, the channel 26 is a cavity within the main tube 21 where an aerosol can pass through the main tube 21.

With FIG. 1 the method for removing semi-volatile material and semi-volatile particles from an aerosol is described. According to the method the main tube 21 with the outer wall 22 is provided, where the heater 23 is arranged within the main tube 21. A volume surrounding the heater 23 is heated by the heater 23. In this way a temperature gradient is established which is shown by an arrow extending from the center of the main tube 21 to the outer wall 22. This means, the temperature in the vicinity of the heater 23 is higher than the temperature in the vicinity of the outer wall 22. Furthermore, an aerosol is led through the main tube 21 and through the two openings 24, 25 of the main tube 21. The aerosol is provided to the inlet 32 of the fitting 30 and led through the fitting 30 and the first opening 24 into the channel 26. Within the channel 26 the aerosol moves from the first opening 24 to the second opening 25. The aerosol is heated by the heater 23 and semi-volatile material and semi-volatile particles of the aerosol are evaporated within the main tube 21. The evaporated semi-volatile material and semi-volatile particles can be adsorbed by the adsorbent material 27. The remaining nonvolatile particles of the aerosol leave the main tube 21 through the second opening 25 which is shown by an arrow. In this way, semi-volatile material and semi-volatile particles are efficiently removed from the aerosol.

After the thermodenuder 20 has been operated for a certain time it is necessary to remove the adsorbed semi-volatile material and semi-volatile particles from the adsorbent material 27. This can be done in one of the following ways.

At first, it is possible to heat the main tube 21 from outside of the main tube 21. For this purpose an external further heater can be arranged adjacent to the outer wall 22. The further heater heats the adsorbent material 27 and the adsorbed semi-volatile material and semi-volatile particles are evaporated. The evaporated semi-volatile material and semi-volatile particles can leave the main tube 21 through the second opening 25. In this way, the adsorbent material 27 is regenerated or cleaned.

At second, it is possible that the second side face 35 of the main tube 21 is formed by a cap 31 that is reversibly attached to the main tube 21. This means, the cap 31 can be removed so that the main tube 21 is open at one of its side faces 35. Once the cap 31 is removed the adsorbent material 27 can be taken out of the main tube 21 replaced by a new adsorbent material 27.

A third possibility to remove semi-volatile material and semi-volatile particles from the adsorbent material 27 is described with FIG. 2.

FIG. 2 shows a cross section through another exemplary embodiment of the thermodenuder 20. The thermodenuder 20 has the same setup as shown in FIG. 1 with the only differences that a further channel 29 is arranged between the outer wall 22 and the adsorbent material 27 and that a further opening 36 is arranged within the first side face 34. This means, in this case the adsorbent material 27 does not extend towards the outer wall 22. The further channel 29 fills the whole space between the adsorbent material 27 and the outer wall 22. The further channel 29 extends parallel to the channel 26. The further opening 36 is arranged adjacent to the further channel 29.

For cleaning or regenerating the adsorbent material 27 a gas flow is provided through the further opening 36 and the further channel 29. The gas flows through the further channel 29 and the adsorbent material 27 which is shown by arrows. The temperature of the gas is higher than the temperature of the adsorbent material 27. Thus, the adsorbent material 27 is heated by the gas. In this way, semi-volatile material and semi-volatile particles adsorbed on or within the adsorbent material 27 are evaporated. The gas is further led from the adsorbent material 27 through the channel 26 out of the main tube 21. With this flow of gas the evaporated semi-volatile material and semi-volatile particles are transported from the adsorbent material 27 out of the main tube 21. In this way, the adsorbent material 27 is cleaned or regenerated.

FIG. 3 shows a cross section through another exemplary embodiment of the thermodenuder 20. The thermodenuder 20 has the same setup as shown in FIG. 1 with the only difference that the thermodenuder 20 does not comprise the adsorbent material 27 and the inner tube 28. In this setup evaporated semi-volatile material and semi-volatile particles from the aerosol can adsorb at the outer wall 22 which has a lower temperature than the surroundings of the heater 23. In this way, semi-volatile material and semi-volatile particles can be removed from an aerosol.

REFERENCE NUMERALS

20: thermodenuder
21: main tube
22: outer wall
23: heater
24: first opening
25: second opening
26: channel
27: adsorbent material
28: inner tube
29: further channel
30: fitting
31: cap
32: inlet
33: passage
34: first side face
35: second side face
36: further opening
x: main axis of extension

The invention claimed is:

1. Thermodenuder comprising:

a main tube with an outer wall, and a heater arranged within the main tube, wherein the heater is arranged in the center of a cross section through the main tube, the heater is spaced apart from the outer wall of the main tube, the main tube has a main axis of extension, the heater extends parallel to the main axis of extension of the main tube, the main tube has two openings which are arranged at opposing side faces of the main tube, and a channel for an aerosol is arranged within the main tube between the heater and the outer wall and between the two openings.

2. Thermodenuder according to claim 1, wherein an adsorbent material is arranged within the main tube between the outer wall and the heater.

3. Thermodenuder according to claim 2, wherein the adsorbent material is arranged spaced apart from heater.

4. Thermodenuder according to claim 2, wherein the adsorbent material comprises ceramic fiber.

5. Thermodenuder according to claim 2, wherein an inner tube is arranged within the main tube between the adsorbent material and the heater, where the inner tube is permeable for gases and the channel is arranged within the inner tube.

6. Thermodenuder according to claim 2, wherein a further channel is arranged between the outer wall and the adsorbent material.

7. Thermodenuder according to claim 1, wherein one of the openings is connected with a fitting.

8. Thermodenuder according to claim 1, wherein the main tube has the shape of a cylinder.

9. Thermodenuder according to claim 1, wherein the heater extends along at least 80% of the length of the main tube parallel to the main axis of extension of the main tube.

10. Thermodenuder according to claim 1, wherein the channel is in direct contact with the heater.

11. Thermodenuder according to claim 1, wherein one of the side faces of the main tube in which one of the openings is arranged is formed by a cap that is reversibly attached to the main tube.

12. Method for removing semi-volatile material and semi-volatile particles from an aerosol, the method comprising the steps of:
   providing a main tube with an outer wall, where a heater is arranged within the main tube,
   heating a volume surrounding the heater by the heater, and
   leading an aerosol through the main tube and through two openings of the main tube where the two openings are arranged at opposing side faces of the main tube, wherein
   the heater is arranged in the center of a cross section through the main tube,
   the heater is spaced apart from the outer wall of the main tube,
   the main tube has a main axis of extension,
   the heater extends parallel to the main axis of extension of the main tube, and
   a channel for the aerosol is arranged within the main tube between the heater and the outer wall and between the two openings.

13. Method according to claim 12, wherein semi-volatile material of the aerosol is evaporated within the main tube.

14. Method according to claim 12, wherein the main tube is heated from outside of the main tube.

15. Method according to claim 12, wherein a gas flow is provided through a further channel that is arranged between the outer wall and an adsorbent material that is arranged between the further channel and the channel.

* * * * *